United States Patent [19]
Valenza et al.

[11] 3,879,469
[45] Apr. 22, 1975

[54] PROCESS FOR PREPARING 6,9-DIOXO-3,8-DIHYDROXY-2-SUBSTITUTED-BICYCLO-3,3,1-NONENES-7

[75] Inventors: André Valenza, Nyon; Ernö Horvath, Prangins; Pierre Courbat, Nyon; Alban Albert, Geneva, all of Switzerland

[73] Assignee: Zyma S.A., Nyon, Switzerland

[22] Filed: Feb. 15, 1973

[21] Appl. No.: 332,871

[30] Foreign Application Priority Data
Feb. 23, 1972 Switzerland.......................... 2590/72

[52] U.S. Cl.......... 260/590; 260/515 R; 260/515 A; 260/516; 260/566 A; 260/607 C; 424/308; 424/309; 424/327; 424/331; 424/335
[51] Int. Cl....................... C07c 49/80; C07c 49/82
[58] Field of Search..................................... 260/590

[56] References Cited
UNITED STATES PATENTS
3,678,044  7/1972  Adams................................ 260/590
3,687,975  8/1972  Houlihan et al. .................... 260/590

*Primary Examiner*—D. Horwitz
*Attorney, Agent, or Firm*—Stevens, Davis, Miller & Mosher

[57] ABSTRACT

Novel bicyclic compunds of formula:

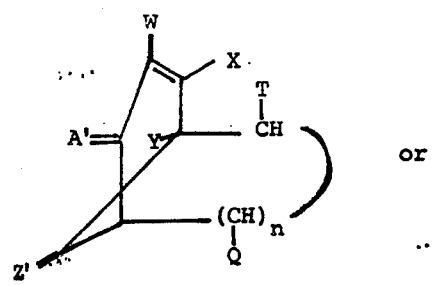

Ia or

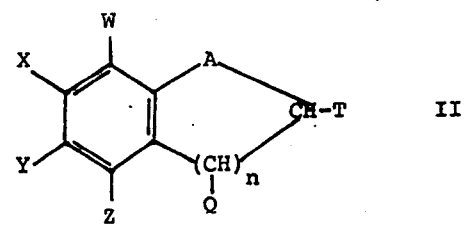

Ib wherein $n$ is an integer having at least the value 1, A' is =O, =S or =NB, B is hydrogen, or a substituted or unsubstituted alkyl group, or substituted or unsubstituted acyl or aryl, Q is hydrogen, a halogen, or an —OH group, or an alkyl, alkoxy, aryl, or carboxyl group, T is a halogen, or a hydroxyl, alkoxy, or substituted or unsubstituted aryl, W is hydrogen, or a halogen, or a hydroxyl, alkyl, alkoxy, substituted or unsubstituted aryl, or carboxyl group, X is a hydroxyl, alkoxy, substituted aryl, or a substituted or unsubstituted amino group, Y is hydrogen, or a halogen, or a hydroxyl, alkyl, alkoxy, substituted or unsubstituted aryl, or carboxyl group, Z' is =O or =NB; these compounds are prepared by reacting a compound of formula:

II wherein A is —O—, —S— or NB, and Z is —OH or —NHB, with an alkali in an at least partially aqueous medium. The novel compounds thus obtained are useful against circulation and hepatic diseases.

20 Claims, No Drawings

PROCESS FOR PREPARING 6,9-DIOXO-3,8-DIHYDROXY-2-SUBSTITUTED-BICYCLO-3,3,1-NONENES-7

This invention is concerned with a process for preparing novel bicyclic compounds having the formula:

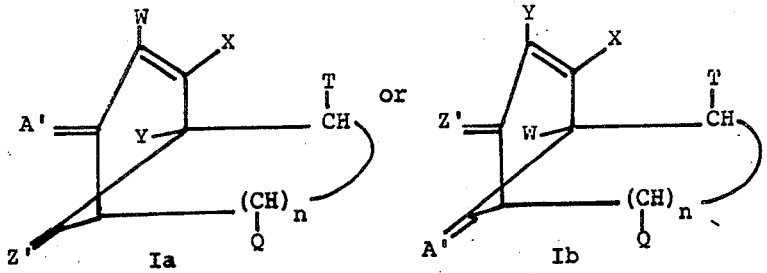

wherein $n$ is an integer having at least the value 1, A' is =O, =S or =NB, B is hydrogen, or a substituted or unsubstituted alkyl group, or substituted or unsubstituted acyl or aryl, Q is hydrogen, a halogen, or an —OH group, or an alkyl, alkoxy, aryl, or carboxyl group, T is a halogen, or a hydroxyl, alkoxy, or substituted or unsubstituted aryl, W is hydrogen, or a halogen, or a hydroxyl, alkyl, alkoxy, substituted or unsubstituted aryl, or carboxyl group, X is a hydroxyl, alkoxy, substituted aryl, or a substituted or unsubstituted amino group, Y is hydrogen, or a halogen, or a hydroxyl, alkyl, alkoxy, substituted or unsubstuted aryl, or carboxyl group, Z' is =O or =NB.

The process for preparing these compounds consists in reacting a compound of formula:

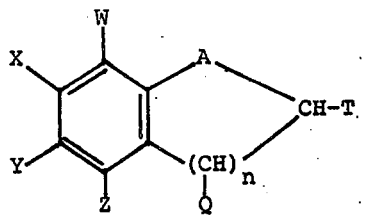

wherein A is —O—, —S—, or =NB, and Z is —OH or —NHB, with an alkali in an at least partly aqueous medium.

Thus a dioxo-6,9-oxy-8-(dihydroxy-3', 4'-phenyl)-2-bicyclo-[3,3,1]-nonene-7-ol-3 of formula:

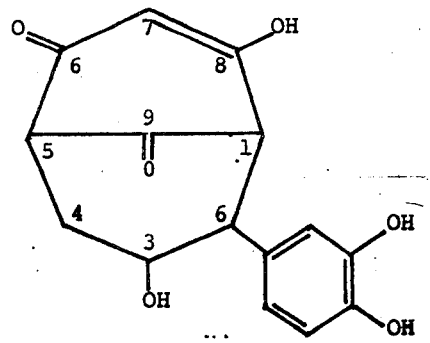

may be prepared by reacting a cyanidanol-3 or epicyanidanol-3 of formula:

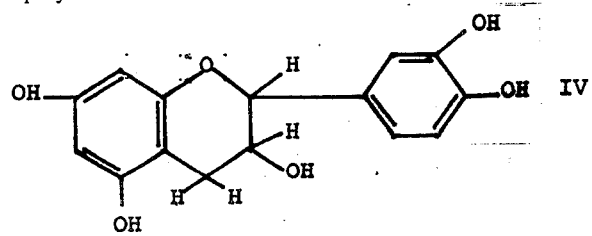

and, if desired, the free acid obtained is transformed into a salt thereof, or a salt obtained is transformed into the free acid.

Among benzopyrane derivatives, the cyanidanols-3 and epicyanidanols-3, which are dihydroxy-3', 4' derivatives of dihydroxy-5,7 dihydro-3,4 benzopyran-ol-3 phenylated in position 2, are condensed by heating in aqueous solution, or by mineral acids, and they are transformed into amorphous tannins which, in the first stages, are insoluble coloured substances known as "red tannins" and are polymers.

Although it is known that a heat treatment of cyanidanols and epicyanidanols with molten potassium hydroxyde leads to a degradation of the molecules into phloroglucine and protocatechic acid, the behaviour of cyanidanols and epicyanidanols in an at least partly aqueous medium in the presence of a base has not yet been studied, and it is precisely this treatment, and the products obtained, which form the basis of this invention.

Preferably the reaction is carried out with at least 1 mole of alkali for 1 mole of cyanidanol-3 or epicyanidanol-3, and preferably with heating. To isolate the novel compounds, the reaction liquor can be cooled and the alkaline cation removed from the solution obtained by passing the cold reaction liquor over a cation exchanger. The acid form can be isolated from the solution obtained, for instance by distilling the acid liquor in vacuo or by atomizing it.

Preferably the reaction is carried out under oxygen free conditions, for example under an atmosphere of nitrogen at a temperature within the range of from 70°C to reflux temperature. The process for preparing "bicyclo-[3,3,1]-nonenols" can be carried out by a batch method, or a continuous method.

The batch method consists for example in gently refluxing the reaction mixture, and when the reaction is finished, in cooling it to room temperature before passing it directly over a cation-exchange resin. The thus freed acid form can be obtained directly in the form of a powder by atomization.

The continuous process consists for example in preparing the reaction mixture at room temperature and under nitrogen. This mixture is introduced, by means of a pump, into the tubes of a tubular reactor heated to 96°–97°C, so that the solution passes through the tubes of the reactor in a time which corresponds to the reaction time. At the outlet of the reactor, the reaction liquor passes first into a coolant and then directly through a cation-exchange resin. If the acid form is desired, the acid aqueous liquor is atomized directly. If a salt is desired, the acid liquor first passes through a cell whose pH is automatically controlled and wherein it is neutralized with the desired base, and then the neutralized liquor is atomized to give the salt in the form of a fine powder.

To prepare salts from the free acid form, the acid may be directly reacted with a base, in stoichiometric ratio, the operation being carried out in water or in a suitable solvent. If the salts do not precipitate, the reaction product can be evaporated or atomized. The transformation of the salt into the acid is also effected in the usual manner.

Concerning the reaction, the following indications can also be given:

Reaction solvents: the most suitable solvent for the reaction is distilled or demineralized water. But aqueous organic solvent can also be used, preferably water-alcohol solutions such as aqueous methanol or ethanol, or aqueous dioxan, e.g. a 20% solution. However, the greater the organic solvent concentration, the slower the reaction will be.

Proportions of reagents: the optimal proportion of alkali with respect to cyanidanol or epicyanidanol is between 1 and 2.5 moles of base for 1 mole of benzopyran derivative. With a proportion lower than 1 mole of the base, the reaction is slowed down and leads to a mixture which still contains untransformed cyanidanol or epicyanidanol. With a proportion greater than 2.5 moles of the base, the reaction leads rather rapidly to mixtures containing unidentified by-products and undesirable polymers.

Concentration of the reaction mixture: the cyanidanol or epicyanidanol concentration has a considerable effect on the good performance of the reaction, indeed, the latter is promoted by weakly concentrated solutions, below 10%. The more concentrated solution promote the occurrence of unidentified and undesirable by-products and polymers.

Reaction time: preferably the reaction is carried out within a period of time between 20 minutes and 1 h 45 min. When the reaction time was less than 20 minutes, in each case untransformed cyanidanol or epicyanidanol was observed. When the reaction tine was more than 1 h 45 min, unidentified impureties and undesirable by-products and polymers appear in the reaction mixture. However, the reaction time depends on the temperature at which it is carried out. Periods of time from 20 min to 45 min correspond to reactions carried out between 90° and 98°C. The most suitable conditions can easily be ascertained by controlled tests.

The bicyclo-[3,3,1]-nonenols of formula III are acid substances wherein the benzopyranic characters no longer exist, further, they are soluble in water at room temperature. Mass spectrography has shown that these acid substances, which possess carbonyl groups, have a molecular weight of 290 which demonstrates that the starting cyanidanol-3 or epicyanidanol-3 is neither degraded, dimerized, nor polymerized. Further, the high resolution of the molecular peak has led to the empirical formula $C_{15}H_{14}O_6$ which was confirmed by elemental analysis of the substances.

Nuclear magnetic resonance spectrography showed that the acid bicyclo-[3,3,1]-nonenols of formula III possess a single aromatic nucleus bearing oly three aromatic hydrogen atoms, it also demonstrates the presence of seven aliphatic hydrogen atoms which consist of a vinylic H, two H belonging to a methylene group (—CH$_2$—) and four H belonging to four =CH— groups.

Infrared spectroscopy confirms the presence of the methylene group, and shows that of hydroxyl groups as well as of carbonyl groups.

Paper chromatography of the degradation products of the novel bicyclo-[3,3,1]-nonenols by means of melted potash shows on the one hand the absence of phloroglucin, and on the other hand the presence of protocatechic acid.

Among the salts of the novel derivatives, first the metal salts must be considered, preferably the alkaline and alkaline earth metal salts, but also the salts of organic bases.

The bicyclo-[3,3,1]-nonenols of formula III and their salts have a pharmacological and clinical activity which is definitely superior to that of cyanidanols-3 and epicyanidanols-3. They are effective against diseases of the circulatory system and hepatic diseases. Thus, the novel products can be used as medicaments. Preferably, the products are used in the form of pharmaceutical compositions. These compositions can contain other therapeutically active compounds and can include any pharmaceutically acceptable carriers, diluants, excipients, etc. These compositions can have various forms, so that they may be administered orally, rectally, percutaneously or by intraveinous injection, they can, as illustrative and non limiting examples, be in the following forms:

a. For oral administration: drops containing 3% of the active product, sugar-coated pills containing 80 mg of this product, tablets, capsules;
b. For rectal administration: suppositories containing 80 mg of active product;
c. For intraveinous injections: 5% solution in a pharmaceutically acceptable medium;
d. For percutaneous administration: ointment or gel.

These novel products of formula III are substantially free of toxicity (the oral $LD_{50}$ for rabbits is 6–8 g/kg, for mice it is 14 g/kg, and for rats it is 14.8 g/kg).

EXAMPLE 1

Batch preparation of (+)-dioxo-6,9 oxy-8-(dihydroxy-3′, 4′ phenyl)-2-bicyclo-[3,3,1]-nonene-7-ol-3 from (+)-cyanidanol-3

330 ml of demineralized water are heated to 60°C under nitrogen. With stirring, 7.5 g of (+)-cyanidanol-3 (25.87 mmoles) are added, and dissolved. Then an aqueous solution of 2.17 g of potassium hydroxide (38.8 mmoles) in 20 ml of demineralized water are quickly added. The reaction mixture thus constituted is refluxed gently for 1 h 45 min, maintaining the reactor under a nitrogen atmosphere. After cooling to 50°C, the reactor is pressurized slightly under nitrogen (0.2 atm) and the solution is passed through a column containing Amberlite IRC 50 resin in acid form, at a rate of about 40 ml per hour. After rinsing the column with 10 ml of demineralized water, the acid solution is directly evaporated. It leaves approximatively 7.4 g of a product which is in the form of an odourless, light fawn-coloured powder, which, in aqueous solution, absorbs at about 285 nm in UV.

The pure acid form of the "bicyclo-[3,3,1]-nonenol" can be obtained by recrystallization, e.g. in acetone or in an acetone-acetic acid mixture. This substance absorbs at 268 nm in UV, in 0.01 N aqueous HCl, and at 281 nm in 0.01 N aqueous NaOH; it melts at 170°–172°C and has a rotational power $[\alpha]_D^{29} = +244°$ in an acetone-water mixture (1:1 vol/vol), or $[\alpha]_D^{29}=+229°$ in ethanol containing 5% of water.

EXAMPLE 2

Batch preparation of the potassium salt of (+)-dioxo-6,9-oxy-8-(dihydroxy-3', 4'-phenyl)-2 bicyclo-[3,3,1]nonene-7-ol-3 from (+)-cyanidanol-3

The process is identical to that of Example 1, but the acid solution collected after passing through the Amberlite IRC 50 resin is neutralized to pH 6.5 by means of an aqueous solution of potassium hydroxide. The thus treated solution is evaporated, it gives 8.4 g of dextrorotary potassium salt, with a yield equivalent to that in Example 1.

EXAMPLE 3

Continuous preparation of (+)-dioxo-6,9-oxy-8-(dihydroxy-3', 4' phenyl)-2 bicyclo-[3,3,1]-nonene-7-ol-3 from (+)-cyanidanol-3

Under nitrogen, an aqueous solution containing 2.5% of (+)-cyanidanol-3 and 0.73% of potassium hydroxide, i.e. 1 mole of (+)-cyanidanol-3 for 1.5 mole of potassium hydroxide, is prepared at room temperature. The thus prepared solution is injected by means of a pump into a tubular reactor heated by means of an oil bath. The temperature of the oil bath is controlled so that the solution passing through the tubes is at 97°C. The hourly rate of the pump is adjusted so as to correspond to at least two-thirds of the tubular total volume, and at the most to twice the tubular inner volume, so that the drop of reaction liquor entering the tubes takes from 30 minutes to 1 h 30 min to pass through the tubes. This rate determines the reaction time. The liquor coming out of the reactor is continuously cooled by passing through a heat exchanger, then it is passed through an Amberlite IRC 50 column, in order to be decationized. The acid liquor is then directly distilled continuously either with a Rotavapor, or with an atomizer. (+)-Dioxo-6,9-oxy-8-(dihydroxy-3', 4'-phenyl)-2-bicyclo-[3,3,1]-nonene-7-ol-3 having the characteristics given in Example 1 is obtained.

EXAMPLE 4

Continuous preparation of the potassium salt of (+)-dioxo-6,9-oxy-8-(dihydroxy-3', 4'-phenyl)-2-bicyclo-[3,3,1]-nonene-7-o-3 from (+)-cyanidanol-3

The process is the same as in Example 3, except that the acid liquor coming out of the Amberlite IRC 50 column is led into cell of an automatic pH regulating apparatus. The pH of the acid solution is brought to 6.5 by means of a suitable potassium hydroxide solution, and the neutralized liquor is directly distilled in a Rotavapor or atomized. The product obtained corresponds to that of Example 2.

EXAMPLE 5

Preparation of (+)-dioxo-6,9-oxy-8-(dihydroxy-3', 4'-phenyl)-2-bicyclo-[3,3,1]-nonene-7-ol-3 from (+)-epicyanidanol-3.

According to Examples 1 or 3, but substituting (+)-epicyanidanol-3 for (+)-cyanidanol-3, the reaction leads to (+)-dioxo-6,9-oxy-8-(dihydroxy-3', 4'-phenyl)-2-bicyclo-[3,3,1]-nonene-7-ol-3 whose characteristics are given in Example 1.

EXAMPLE 6

Preparation of (−)-dioxo-6,9-oxy-8-(dihydroxy-3', 4'-phenyl)-2-bicyclo-[3,3,1]-nonene-7-ol-3

By using either (−)-cyanidanol-3 or (−)-epicyanidanol-3 in the place of (+)-cyanidanol-3, and proceeding according to Example 1 or 3, (−)-dioxo-6,9-oxy-8-(dihydroxy-3', 4'-phenyl)-2-bicyclo-[3,3,1]7-ol-3 is obtained, which after purification absorbs at 268 nm in UV, in 0.01 N aqueous HCl, and at 281 nm in 0.01 N aqueous NaOH; it shows a rotational power of $[\alpha]_D^{29}=-241°$ in an acetone-water mixture (1:1 vol/vol), or $[\alpha]_D^{29}=-228°$ in ethanol containing 5% of water; it melts at 171°–172°C.

EXAMPLE 7

Preparation of (±)-dioxo-6,9 oxy-8(dihydroxy-3', 4'-phenyl)-2-bicyclo-[3,3,1]-nonene-7-ol-3

By using either (±)-cyanidanol-3 or (±)-epicyanidanol-3 in the place of (+)-cyanidanol-3, and proceeding according to Example 1 or 3, (±)-dioxo-6,9-oxy-8-(dihydroxy-3', 4'-phenyl)-2-bicyclo-[3,3,1]-nonene-7-ol-3 is obtained, which after purification has a rotational power of $[\alpha]_D^{29}=0,4$ both in an acetone-water mixture (1:1 vol/vol) and in ethanol containing 5% of water. This racemic absorbs at 267 nm in UV, in 0.01 N aqueous HCl, and at 282 nm in 0.01 N aqueous NaOH; it melts at 195°C.

EXAMPLE 8

Preparation of the sodium salt of (−)-dioxo-6,9 oxy-8-(dihydroxy-3', 4'-phenyl)-2-bicyclo-[3,3,1]-nonene-7-ol-3

By neutralizing to pH 6.5 an aqueous solution of (−)-dioxo-6,9-oxy-8-(dihydroxy-3', 4'-phenyl)-2-bicyclo-[3,3,1]-nonene-7-ol-3 by means of an aqueous solution of sodium hydroxide, and then distilling the neutralized liquor, the corresponding sodium salt is obtained with a quantitative yield.

The compounds in question have an action on the wall of veineous and arterial vessels. It is a matter of a specific and protective action on the structure of conjunctive tissue. In particular, these compounds act by improving the stability of collagen and glycoproteins, which, with elastin are the basic constituents of conjunctive tissue. In hepatic diseases there is also an action on the cell energy metabolism, by improving the energy production of cells (ATP) and the metabolism of lipids.

What is claimed is:

1. Process for preparing a 6,9-dioxo 3,8-dihydroxy 2-substituted bicyclo 3,3,1-nonene-7 of the formula

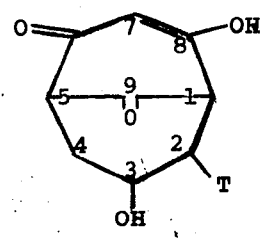

wherein T is unsubstituted phenyl or hydroxy substituted phenyl, characterized in that a 2-substituted 3,5,7-trihydroxy 1,2-chroman of formula,

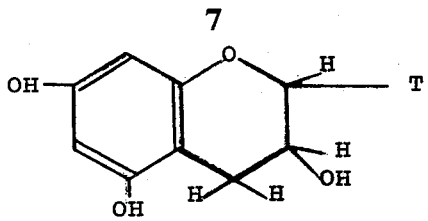

wherein T has the meaning set forth above, is reacted with alkali in an aqueous medium.

2. A process for preparing an alkali salt of a dioxo-6,9-oxy-8-(dihydroxy-3', 4'-phenyl)-2-bicyclo-[3,3,1]-nonene-7-ol-3 of formula:

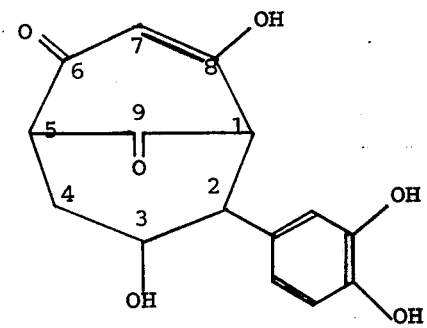

III comprising reacting a cyanidanol-3 or epicyanidanol-3 of the formula:

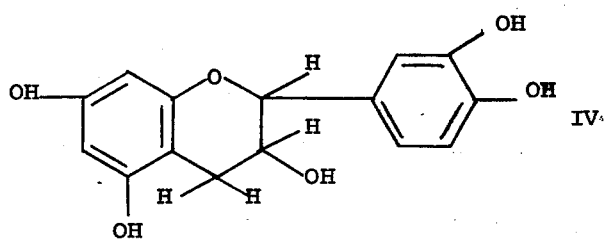

IV with alkali in an aqueous medium.

3. A process according to claim 2, characterized in that 1 to 2.5 moles of alkali are used per mole of cyanidanol-3 or epicyanidanol-3.

4. A process according to claim 2, characterized in that it is carried out at a temperature above 70°C.

5. A process according to claim 2, characterized in that it is carried out a gentle reflux.

6. A process according to claim 2, characterized in that the amount of cyanidanol-3 or epicyanidanol-3 in the reaction solution is less than 10%, 7. A process according to claim 2, characterized in that the reaction time is less than 1 h 45 min.

8. A process according to claim 2, characterized in that (+)-dioxo-6,9-oxy-8-(dihydroxy-3', 4'-phenyl)-2-bicyclo-[3,3,1]-nonene-7-ol-3 or a salt thereof is prepared.

9. A process according to claim 2, characterized in that (−)-dioxo-6,9-oxy-8-(dihydroxy-3', 4'-phenyl)-2-bicyclo-[3,3,1]-nonene-7-ol-3 or one of its salts is prepared.

10. A process according to claim 2, characterized in that (±)-dioxo-6,9-oxy-8-(dihydroxy-3', 4'-phenyl)-2-bicyclo-[3,3,1]-nonene-7-ol-3 or a salt thereof is prepared.

11. A process according to claim 2, characterized in that the starting material is (+)-cyanidanol-3.

12. A process according to claim 2, characterized in that the starting material is (+)-epicyanidanol-3.

13. A process according to claim 2, characterized in that the starting material is (−)-cyanidanol-3.

14. A process according to claim 2, characterized in that the starting material is (−)-epicyanidanol-3.

15. A process according to claim 2, characterized in that the starting material is (±)-cyanidanol-3.

16. A process according to claim 2, characterized in that the starting material is (±)-epicyanidanol-3.

17. Dioxo-6,9-oxy-8-(dihydroxy-3', 4'-phenyl)-2 bicyclo-[3,3,1]-nonene-7-ol-3, and salts thereof.

18. (+)-Dioxo-6,9-oxy-8-(dihydroxy-3', 4'-phenyl)-2-bicyclo-[3,3,1]-nonene-7-ol-3, and salts thereof.

19. (−)-Dioxo-6,9-oxy-8-(dihydroxy-3', 4'-phenyl)-2-bicyclo-[3,3,1-nonene-7-ol-3, and salts thereof.

20. (±)-Dioxo-6,9-oxy-8-(dihydroxy-3', 4'-phenyl)-2-bicyclo-[3,3,1]-nonene-7-ol-3, and salts thereof.

* * * * *